United States Patent [19]
Bailey et al.

[11] Patent Number: 5,791,404
[45] Date of Patent: Aug. 11, 1998

[54] FLOODING REDUCTION ON A TUBULAR HEAT EXCHANGER

[75] Inventors: Ralph T. Bailey, Uniontown; Karl H. Schulze, North Canton; Dennis W. Johnson, Barberton; Robert B. Myers, Copley Township, all of Ohio

[73] Assignee: McDermott Technology, Inc., New Orleans, La.

[21] Appl. No.: 691,725

[22] Filed: Aug. 2, 1996

[51] Int. Cl.$^6$ ............................................... F28F 9/22
[52] U.S. Cl. ...................... 165/159; 165/910; 422/173
[58] Field of Search .............................. 165/159, 910, 165/161, 95, 96; 422/173, 176

[56] References Cited

U.S. PATENT DOCUMENTS

| | | | |
|---|---|---|---|
| 1,577,477 | 3/1926 | Mallory | 165/159 |
| 2,411,097 | 11/1946 | Kopp | 165/159 |
| 3,180,408 | 4/1965 | Grotz, Jr. et al. | 165/159 X |
| 3,326,280 | 6/1967 | Bosquain et al. | 165/161 |
| 5,113,928 | 5/1992 | Myers | 165/159 X |

FOREIGN PATENT DOCUMENTS

| | | | |
|---|---|---|---|
| 0049495 | 3/1984 | Japan | 165/159 |
| 0194189 | 8/1987 | Japan | 165/159 |
| 3006388 | 1/1988 | Japan | 165/910 |

*Primary Examiner*—John Rivell
*Assistant Examiner*—Christopher Atkinson
*Attorney, Agent, or Firm*—Robert J. Edwards; Eric Marich

[57] ABSTRACT

An asymmetrical, or non-uniform arrangement of heat exchanging tubes in a second stage heat exchanger of an integrated flue gas treatment system provides improved flow characteristics and reduces or eliminates flooding caused by the counter-flow of upwardly rising flue gases and downwardly falling reagent and condensate through the heat exchanging tubes. The non-uniform spacing produces a non-uniform velocity profile with at least one low velocity region in each row, allowing reagent and condensate to drain downward at said low velocity region, thereby preventing high gas phase pressure drop caused by the onset of flooding. Embodiments are provided in which one of every six tubes are removed from each row in a uniform array of tubes, or one of every four tubes are removed from each row in a uniform array of tubes. Other asymmetrical, or non-uniform spacings are possible.

17 Claims, 3 Drawing Sheets

| Std. Geometry<br>1.0 gpm/ft^2 | 1 of 6 Removed<br>1.3 gpm/ft^2 | 1 of 4 Removed<br>1.3 gpm/ft^2 |
|---|---|---|

# 5,791,404

FLOODING REDUCTION ON A TUBULAR HEAT EXCHANGER

FIELD AND BACKGROUND OF THE INVENTION

The invention relates to an improvement in the design and operating performance of pollution removal equipment that also recovers heat from waste gases. In particular, the invention relates to an improved heat exchanger tube orientation which eliminates flooding in the second stage of an integrated flue gas treatment heat exchanger that can occur when flue gases rising up through the heat exchanger are able to prevent condensate and reagent from falling through the heat exchanger tubes.

An integrated flue gas treatment condensing heat exchanger is a type of condensing heat exchanger designed to enhance the removal of pollutants from a flue gas stream. There are four primary sections of an integrated flue gas treatment condensing heat exchanger system. They are a first heat exchanger stage, an interstage transition region, a second heat exchanger stage and a mist eliminator. Primary differences between an integrated flue gas treatment design and conventional condensing heat exchanger designs include: the integrated flue gas treatment design has two heat exchanger stages instead of one; the interstage transition region connecting the two heat exchanger stages is used to direct the gas to the second heat exchanger as well as act as a collection tank and improve treatment of the gas between stages; the gas flow in the second heat exchanger stage is upward rather than downward; the gas outlet of the second heat exchanger stage is equipped with an alkali reagent spray system; and a mist eliminator is used to separate water formed by condensation and sprays from the flue gas.

Most of the sensible heat is removed from the flue gas in the first heat exchanger stage of an integrated flue gas treatment system. The transition region can be equipped with a water or alkali spray system. This system saturates the flue gas with moisture before it enters the second heat exchanger stage and also assists in removing sulfur pollutants from the gas.

The second heat exchanger stage is operated in the condensing mode, removing latent heat from the gas along with pollutants. The upper region of the second heat exchanger stage is equipped with an alkali solution spray system. The gases in this stage flow upward while condensed water droplets and alkali spray fall downward. This counter-current gas and droplet flow provides a scrubbing mechanism that enhances particulate and pollutant collection and removal. The condensed gases, particulate and reacted alkali solution are all collected at the bottom of the transition section. The flue gas outlet of the integrated flue gas treatment system is also equipped with a mist eliminator to reduce the chance of moisture carry over.

Known heat exchangers have multiple rows of heat exchanging tubes arranged in uniformly spaced staggered arrays, referred to as a triangular pitch, as shown in FIG. 1. The gases and condensate flow through the spaces between the tubes created by the staggered spacing. Conventionally, the spacing between adjacent heat exchanging tubes is symmetrical and constant, as is the vertical spacing or pitch between tubes in adjacent rows.

Within the second stage of the integrated flue gas treatment condensing heat exchanger, the flue gas travels in an upward direction while the alkali reagent falls downward over the heat exchanger tubes. A condition called flooding occurs when the velocity of the flue gas traveling upward through the second stage heat exchanger is sufficient to prevent the downward flow of reagent and condensate between the heat exchanger tubes. When flooding occurs, the downward force of gravity exerted on the liquid is overcome by the drag force exerted by the upwardly flowing gas. Since the tube spacing is uniform, the velocity between the tubes in the heat exchanger is also highly uniform. Thus, the flooding condition occurs uniformly over the entire cross-section of the heat exchanger. Because of this uniformity, the flooding condition is typified by a sudden and large increase in the gas pressure drop through the heat exchanger as liquid is prevented from draining through the heat exchanger. Equipment limitations (fans, for example) effectively prevent operation in the flooded condition, thus limiting the range of gas flow and reagent flow through a unit.

Using existing technology, and for a given gas flow, flooding can be avoided only by increasing the unrestricted flow area (size) of the heat exchanger so that the critical flow for flooding is not achieved in operation. This is normally achieved by increasing the physical size of the heat exchanger.

SUMMARY OF THE INVENTION

An object of the invention is to overcome many of the limitations imposed by a flooding condition by either increasing the velocity at which flooding occurs or eliminating the sudden large increase in gas phase pressure drop that accompanies the onset of flooding.

Accordingly, a second stage heat exchanger for an integrated flue gas treatment system is provided having a modified tube geometry configuration which improves the gas flow and condensate counter-flow between the tubes. An asymmetrical, or non-uniform, tube arrangement is provided in which some of the tubes in each staggered row of a heat exchanger are selectively spaced or removed to create a greater space between adjacent tubes, and to create non-uniformity in the gas path flow area, without drastically reducing the efficiency of the heat exchanger. By selectively spacing or removing a fraction of the heat exchanger tubes from each row of staggered tubes (every $n^{th}$ tube, n being an integer greater than 1, i.e., 2, 3, 4, ... n), a non-uniform velocity profile with at least one low velocity region in each row is created, allowing reagent and condensate to drain downward at said low velocity region through the heat exchanger. This configuration of heat exchanger tubes can increase the allowable flue gas flow rate and reduces or eliminates the sudden increase in gas phase pressure drop associated with (caused by) the onset of flooding.

In one embodiment of the invention, one of every six tubes in an existing heat exchanger would be removed and in a second embodiment, one of every four tubes is eliminated, providing multiple channels or drains through the array of heat exchanging tubes in the heat exchanger.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
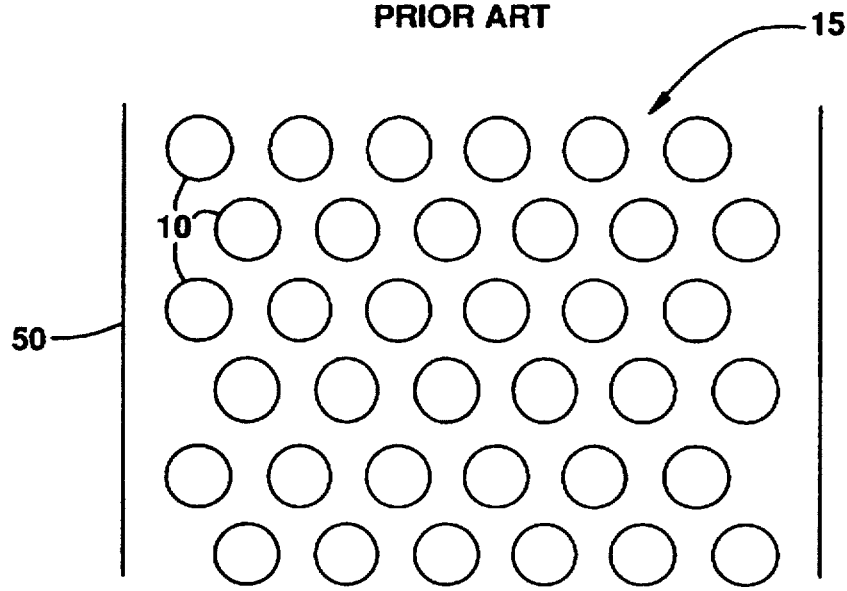
FIG. 1 is a front sectional elevation of an array of heat exchanging tubes as known in the art.

Referring now to the drawings, where the same or similar elements are identified using the same reference numerals, FIG. 1 shows a heat exchanger 50 with a conventional array 15 of heat exchanger tubes 10 with a uniform triangular pitch. As can be seen in a standard geometry tube array of the heat exchanger tubes 10, there is a limited gap between adjacent tubes for condensate and flue gases to flow between the tubes. Additionally, the gap between the tubes is uniform throughout the tube array 15. In this arrangement, condensate and reagent falling between the tubes must impinge on at least one heat exchanging tube 10 and is likely to impinge multiple tubes 10.

Figure 2:
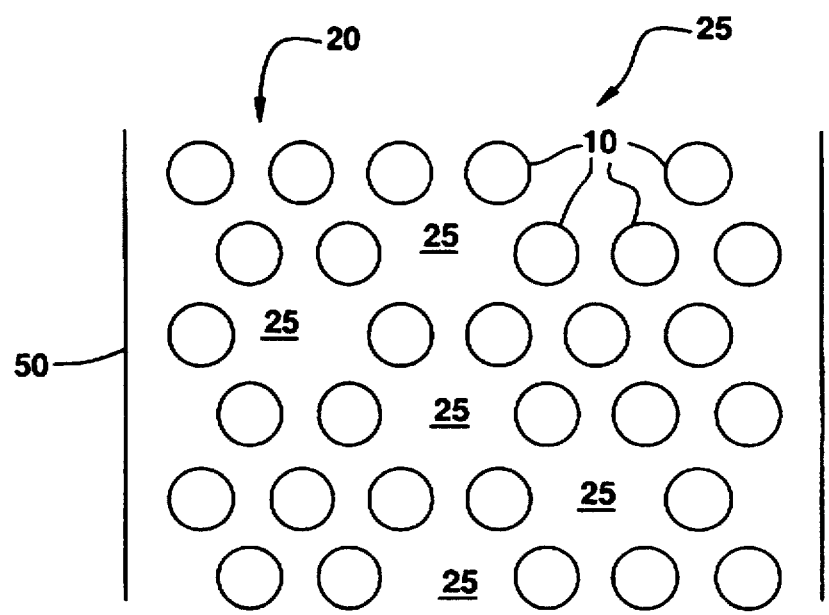
FIG. 2 is a front sectional elevation of an array of heat exchanging tubes according to a first embodiment of the invention wherein one out of every six tubes has been removed from the array.
Figure 3:
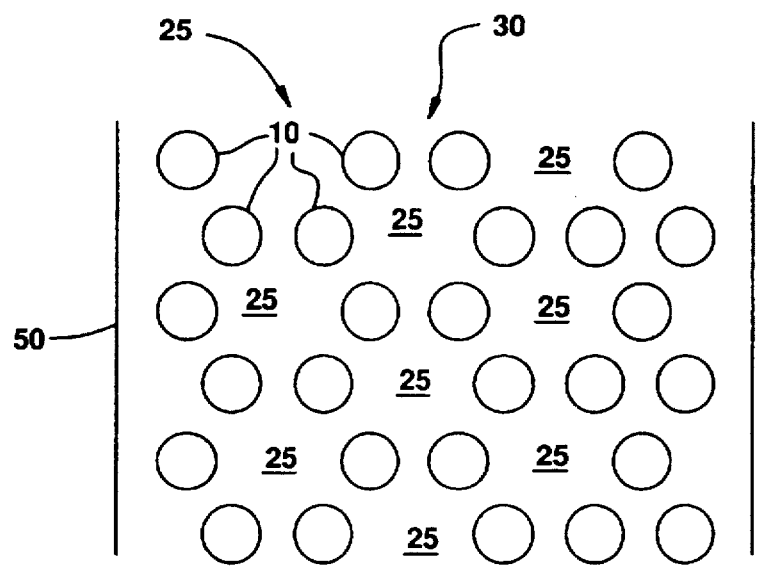
FIG. 3 is a front sectional elevation of an array of heat exchanging tubes according to a second embodiment of the invention one out of every four tubes has been removed from the array.

FIG. 2 shows an embodiment of a heat exchanger 50 in which one out of every six tubes 10 has been removed from the horizontal rows of heat exchanger tubes. In FIGS. 2 and 3, it will be noted that only a portion of an array of heat exchanger tubes 10 is shown. Other tubes form the balance of each of the staggered, horizontal rows, and the removal of particular tubes shown in the Figs. assumes the presence of such other tubes were taken into account. Actual heat exchangers can have over 100 to 150 or more tubes in each of the staggered rows. Accordingly, the drawing of FIG. 2 merely shows such a portion; a 6 row by 6 column array 20 of tubes 10. In a larger array, the removal of tubes ratio would be maintained accordingly.

In this embodiment, at least one distinct channel 25 is provided between tubes 10 in each horizontal row of tubes in array 20. A conventional array 15 has a center to center tube separation of 1.75 inches. In the arrangement of the invention, at least one adjacent pair of tubes 10 has a center to center distance that is twice as large as the distance between the remaining pairs of adjacent tubes 10, or in the case of a standard separation, 3.5 inches. The increased separation distance between tubes 10 creates a non-uniform cross-sectional flow area, which results in a non-uniform gas velocity profile. The pattern would repeat as required to provide multiple channels 25 across the entire width of the heat exchanger 50. The non-uniform gas velocity profile provides regions of low gas velocity that allows the drainage of condensate and alkali spray downward through the heat exchanger. This occurs even though flooding would be predicted based on the average gas velocity.

FIG. 3 shows an array 30 in which one of every four tubes 10 has been removed from the rows of the array 30, to provide the multiple channels 25 in each row of tubes. This orientation or arrangement of tubes 10 further improves the counter-flow characteristics of flue gases and condensate material through the heat exchanger 50.

Figure 4:
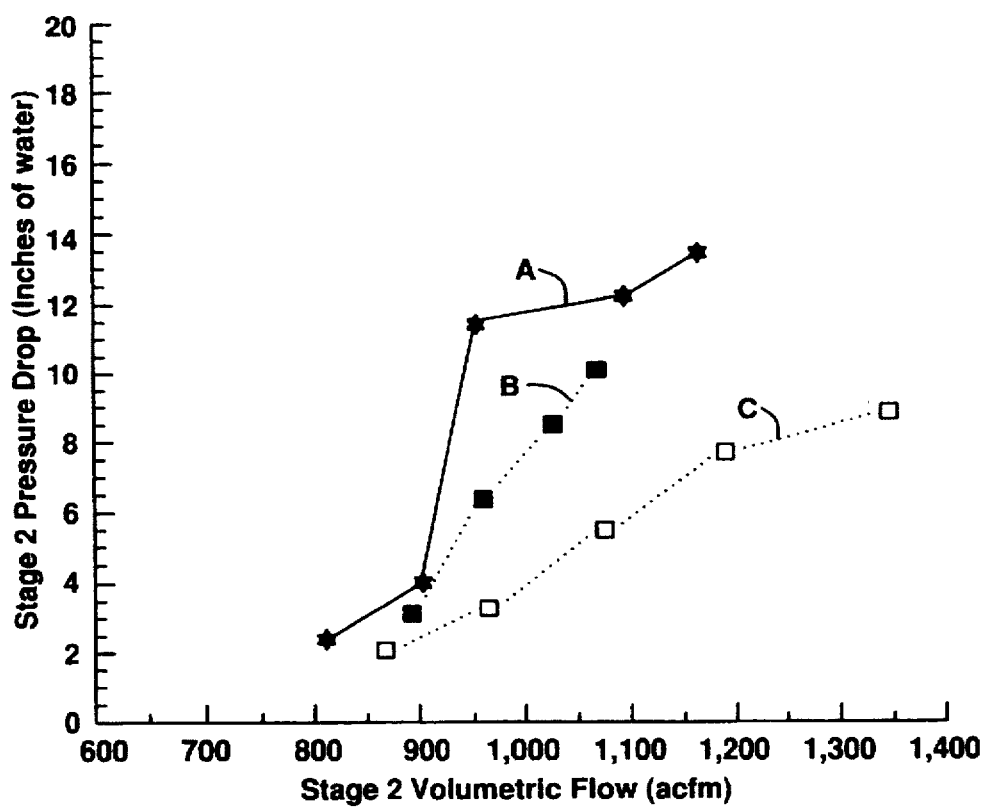
FIG. 4 is a graph plotting the relationship of volumetric flow through the heat exchanger against the observed pressure drop across the heat exchanger for each of the heat exchange arrangements shown in FIGS. 1–3 at a specific reagent spray liquid flux.
Figure 5:
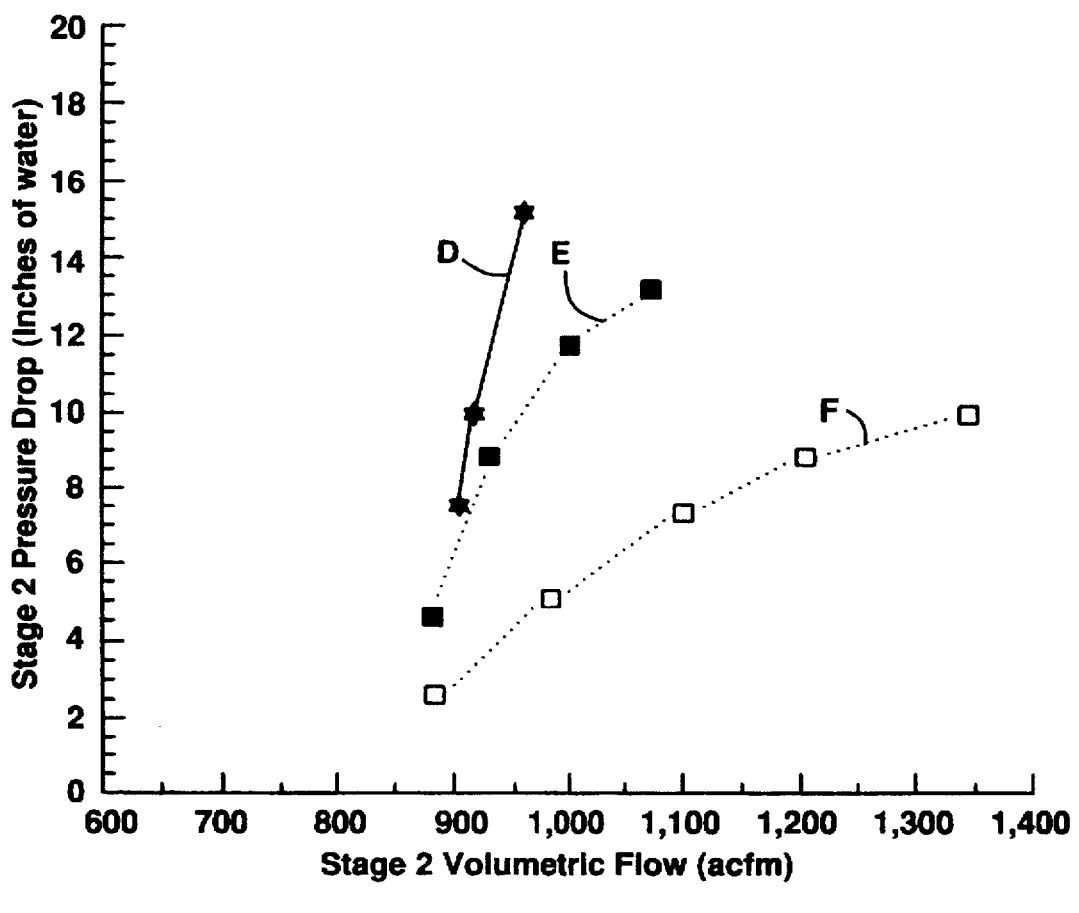
FIG. 5 is a graph plotting the volumetric flow through a second stage heat exchanger against the observed pressure drop across the heat exchanger for each of the three heat exchanging tube arrangements as shown in FIGS. 1–3 with greater reagent spray liquid flux than shown in FIG. 4.

FIGS. 4 and 5 graphically show the results of operating the second stage heat exchanger of an integrated gas flue gas treatment system using each of the three tube arrangements in FIGS. 1–3 at two different reagent spray flow rates. As can be seen by curves A (conventional symmetric triangular pitch tube array, 1.0 gpm/ft$^2$ liquid flux) and D (conventional symmetric triangular pitch tube array, 2.0 gpm/ft$^2$ liquid flux), a sudden increase in pressure drop indicating a flooding condition in the heat exchanger occurs when a standard symmetric tube array 15 is used. The removal of one of every six tubes results in a less asymptotic curve as shown by curves B (one in six tubes removed array, 1.3 gpm/ft$^2$ liquid flux) and E (one in six tubes removed array, 2.7 gpm/ft$^2$ liquid flux) respectively for each of the two different spray flow rates. Although the operational results of eliminating one of every six tubes such as shown in the array 20 of FIG. 2 does not result in complete elimination of a pressure drop increase, it is vastly improved over the symmetrical uniform array 15, which is commonly used.

When one of every four tubes is eliminated in the array 30 of FIG. 3, operational limitations of the second stage heat exchanger are greatly improved as shown by curves C (one in four tubes removed array, 1.3 gpm/ft$^2$ liquid flux) and F (one in four tubes removed array, 2.7 gpm/ft$^2$ liquid flux). For each of the curves C and F, the increase in pressure drop is much more gradual than that exhibited with tube array 15, shown by curves A and D. For instance, at a volumetric flow of 1200 actual cubic feet per minute, the pressure drop is only about 7.5 inches of water using heat exchanger tube array 30, having one of every four tubes eliminated. However, when a standard symmetrical tube array is used, a volumetric flow of 1200 actual cubic feet per minute is not obtainable due to flooding conditions, and at best, the pressure drop is nearly double the pressure drop exhibited by the tube array 30.

As shown by curves B, C, E and F in FIGS. 4 and 5, the non-uniform tube geometry configuration reduces or eliminates the sudden, large increase in pressure drop associated with flooding in the heat exchanger. This allows continuous operation of the unit without the reagent spray or condensed water becoming suspended in the heat exchanger flue gas flow.

Additional performance improvements that are realized using an asymmetrical, or non-uniform tube configuration design for the second stage heat exchanger of an integrated flue gas treatment design includes allowing a unit to operate at optimal design conditions wherein gas and reagent flow are optimized for maximum heat recovery and pollutant removal, without encountering large pressure drops across the second stage heat exchanger due to flooding. In the flooded condition, energy consumption of the integrated flue gas treatment is increased because of the pressure drop caused by the suspension of liquid in the second stage heat exchanger.

The asymmetrical, or non-uniform, tube arrangement designs allows the unit to be operated over a wider range of gas and liquid flow ranges, thus increasing the number of potential applications. The reagent liquid flux required to achieve the required pollutant removal will also vary with the activity of the reagent. For example, using a sodium reagent, the integrated flue gas treatment system can achieve greater than 90% SO$_2$ recovery with a liquid flux of about 6 gpm/ft$^2$. If a less reactive reagent is used, a higher liquid flux will be required to achieve the same SO$_2$ removal efficiency.

Reagents that are less expensive and more environmentally acceptable, can be considered if the unit can be operated efficiently at higher reagent flow rates. As shown in the graphs of FIGS. 4 and 5, higher reagent flow rates can be successfully used with the asymmetrical tube arrays 20 and 30 and still exhibit improved functionality at higher volumetric flow rates. Further, when flooding occurs, reagent and condensate accumulate at the top of the second stage heat exchanger and overload the mist eliminators. This allows reagent, pollutants and condensate to pass downstream of the integrated flue gas treatment system and possibly into the atmosphere. By reducing or eliminating flooding conditions, the asymmetric tube arrays 20 and 30 help to prevent this problem.

Use of the non-uniform tube arrays 20 and 30 does not have a large detrimental effect on the heat recovery performance of an integrated flue gas treatment system. Heat recovery occurs throughout the integrated flue gas treatment system and in one common embodiment, about 60% of the usable heat is recovered in the first heat exchanger stage, leaving only 40% of the recovery burden to the second heat exchanger state. Therefore, if one in four tubes is removed from the second heat exchanger stage as in array 30, there will be a 25% reduction in heat transfer surface in the heat exchanger stage but only a 10% reduction in the ability of the integrated flue gas treatment to recover usable heat.

The effect on pollution removal performance is also minimal for the asymmetric tube arrays 20, 30. The amount of pollutants removed from the gas is a function of reagent surface area due to reagent spray and the surface area of the tubes 10. If the embodiment of array 30 is used, the $SO_2$ removal efficiency decreases only from about 92% to about 87% pollutant removal. However, because of the reduction or elimination of flooding conditions during operation, if additional pollutant removal is needed, the reagent liquid flux can be increased to obtain the desired value.

Removing heat exchanging tubes from the array 15, rather than decreasing the size of the heat exchanging tubes or increasing the distance between adjacent tubes, has the effect that the physical size of the second heat exchanging stage does not need to be changed. Calculations show that simply increasing the spacing between tubes or changing the size of the tubes while maintaining the same symmetrical tube array pattern 15 will increase the volumetric flow rate at which flooding occurs. However, the sudden large increase in pressure drop associated with the onset of flooding will remain. Increasing flow area asymmetrically and in the disclosed non-uniform manner not only increases the volumetric flow at which flooding occurs, but also modifies the pressure drop behavior associated with the onset of flooding.

Further, although specific examples of heat exchanger tube arrays in which one in four and one in six tubes are eliminated have been described, other ratios, such as one in three, one in five, one in n (where n is an integer greater than 1, i.e., 2, 3, 4, . . . n, but of course, less than the number of tubes in a given row) may be used as well, as long as the overall spacing between tubes in a given horizontal row is asymmetric, or non-uniform. It is preferred that the locations where the resulting asymmetric, or non-uniform spacings are provided in any given row are not located near similar non-uniform spacings of an adjacent upper or lower row, so that a continuous, substantially, vertical zig-zag lane is not provided throughout the array of heat exchanger tubes. However, even if such a lane is provided, the arrangement of tubes according to the present invention would still prevent flooding, and still perform its heat exchanging and pollutant-removal functions, albeit perhaps at less than maximum efficiency.

While specific embodiments of the invention have been shown and described in detail to illustrate the application of the principles of the invention, those skilled in the art will appreciate that changes may be made in the form of the invention covered by the following claims without departing from such principles. For example, the present invention may be applied to new construction involving integrated flue gas treatment systems, or to the replacement, repair or modification of existing integrated flue gas treatment systems. In some embodiments of the invention, certain features of the invention may sometimes be used to advantage without a corresponding use of the other features. Accordingly, all such changes and embodiments properly fall within the scope of the following claims.

We claim:

1. An improved tube orientation in a second stage heat exchanger in an integrated flue gas treatment system, wherein a flue gas flows predominantly upwardly and a condensate and a reagent spray flows predominantly downwardly, which reduces or eliminates a sudden large increase in gas phase pressure drop which accompanies a flooding condition that can occur when the flue gas rising up through the second stage heat exchanger is sufficient to prevent the downward flow of reagent and condensate between the tubes, the heat exchanger comprising:

a casing having a pair of side walls; and a plurality of heat exchanging tubes arranged in a tube array of staggered rows and oriented horizontally within the casing between the side walls, the staggered rows arranged wherein a non-uniform increased spacing is provided between some of the adjacent tubes in each row such that the increased spacing between said adjacent tubes creates a non-uniform velocity profile with at least one low velocity region in each row, allowing reagent and condensate to drain downward at said low velocity region, thereby preventing the high gas phase pressure drop caused by the onset of flooding.

2. The second stage heat exchanger according to claim 1, wherein the staggered rows are arranged such that a first horizontal distance between a first pair of adjacent heat exchanging tubes in one row is different from a second horizontal distance between at least one other pair of adjacent heat exchanging tubes in the same row.

3. The second stage heat exchanger according to claim 2, wherein the second horizontal distance is equal to twice the first horizontal distance.

4. The second stage heat exchanger according to claim 2, wherein the at least one other pair of adjacent heat exchanging tubes comprises one other pair of adjacent heat exchanging tubes.

5. The second stage heat exchanger according to claim 2, wherein the first horizontal distance is measured between a center of each adjacent tube in a given row, and the distance is between about 1.5 and 2.5 inches.

6. The second stage heat exchanger according to claim 5, wherein the first horizontal distance is measured between a center of each adjacent tube in a given row, and the distance is about 1.75 inches.

7. The second stage heat exchanger according to claim 1, wherein the staggered rows are spaced such that a first distance between a first pair of tubes in each row is different than a second distance between a second pair of tubes in each row, at least one additional tube being located between the first pair of tubes and the second pair of tubes.

8. An improved tube orientation in a second stage heat exchanger in an integrated flue gas treatment system, wherein a flue gas flows predominantly upwardly and a condensate and a reagent spray flows predominantly downwardly, which reduces or eliminates a sudden large increase in gas phase pressure drop which accompanies a flooding condition that can occur when the flue gas rising up through the second stage heat exchanger is sufficient to prevent the downward flow of reagent and condensate between the tubes, the heat exchanger comprising:

a casing having a pair of side walls; and a plurality of heat exchanging tubes arranged in a tube array of staggered rows and oriented horizontally within the casing between the side walls, the staggered rows arranged wherein a non-uniform increased spacing is provided between some of the adjacent tubes in each row, the non-uniform increased spacings of one row not located near similar non-uniform increased spacings of adjacent upper or lower rows so that a continuous, substantially vertical lane throughout the tube array is not provided, such that the increased spacing between said adjacent tubes creates a non-uniform velocity profile with at least one low velocity region in each row, allowing reagent and condensate to drain downward at said low velocity region, thereby preventing the high gas phase pressure drop caused by the onset of flooding.

9. The second stage heat exchanger according to claim 8, wherein the staggered rows are arranged such that a first horizontal distance between a first pair of adjacent heat exchanging tubes in one row is different from a second horizontal distance between at least one other pair of adjacent heat exchanging tubes in the same row.

10. The second stage heat exchanger according to claim 9, wherein the second horizontal distance is equal to twice the first horizontal distance.

11. The second stage heat exchanger according to claim 9, wherein the at least one other pair of adjacent heat exchanging tubes comprises one other pair of adjacent heat exchanging tubes.

12. The second stage heat exchanger according to claim 9, wherein the first horizontal distance is measured between a center of each adjacent tube in a given row, and the distance is between about 1.5 and 2.5 inches.

13. The second stage heat exchanger according to claim 12, wherein the first horizontal distance is measured between a center of each adjacent tube in a given row, and the distance is about 1.75 inches.

14. The second stage heat exchanger according to claim 8, wherein the staggered rows are spaced such that a first distance between a first pair of tubes in each row is different than a second distance between a second pair of tubes in each row, at least one additional tube being located between the first pair of tubes and the second pair of tubes.

15. An improved tube orientation in a second stage heat exchanger in an integrated flue gas treatment system, wherein a flue gas flows predominantly upwardly and a condensate and a reagent spray flows predominantly downwardly, which reduces or eliminates a sudden large increase in gas phase pressure drop which accompanies a flooding condition that can occur when the flue gas rising up through the second stage heat exchanger is sufficient to prevent the downward flow of reagent and condensate between the tubes, the heat exchanger comprising:

a casing having a pair of side walls; and a plurality of heat exchanging tubes arranged in a tube array of staggered rows and oriented horizontally within the casing between the side walls, the staggered rows arranged wherein a non-uniform increased spacing is provided between some of the adjacent tubes by selectively removing every nth tube, n an integer greater than 1, i.e., 2, 3, 4, . . . n, in each row such that the increased spacing between said adjacent tubes creates a non-uniform velocity profile with at least one low velocity region in each row, allowing reagent and condensate to drain downward at said low velocity region, thereby preventing the high gas phase pressure drop caused by the onset of flooding.

16. The second stage heat exchanger according to claim 15, wherein n=6.

17. The second stage heat exchanger according to claim 15, wherein n=4.

* * * * *